UNITED STATES PATENT OFFICE.

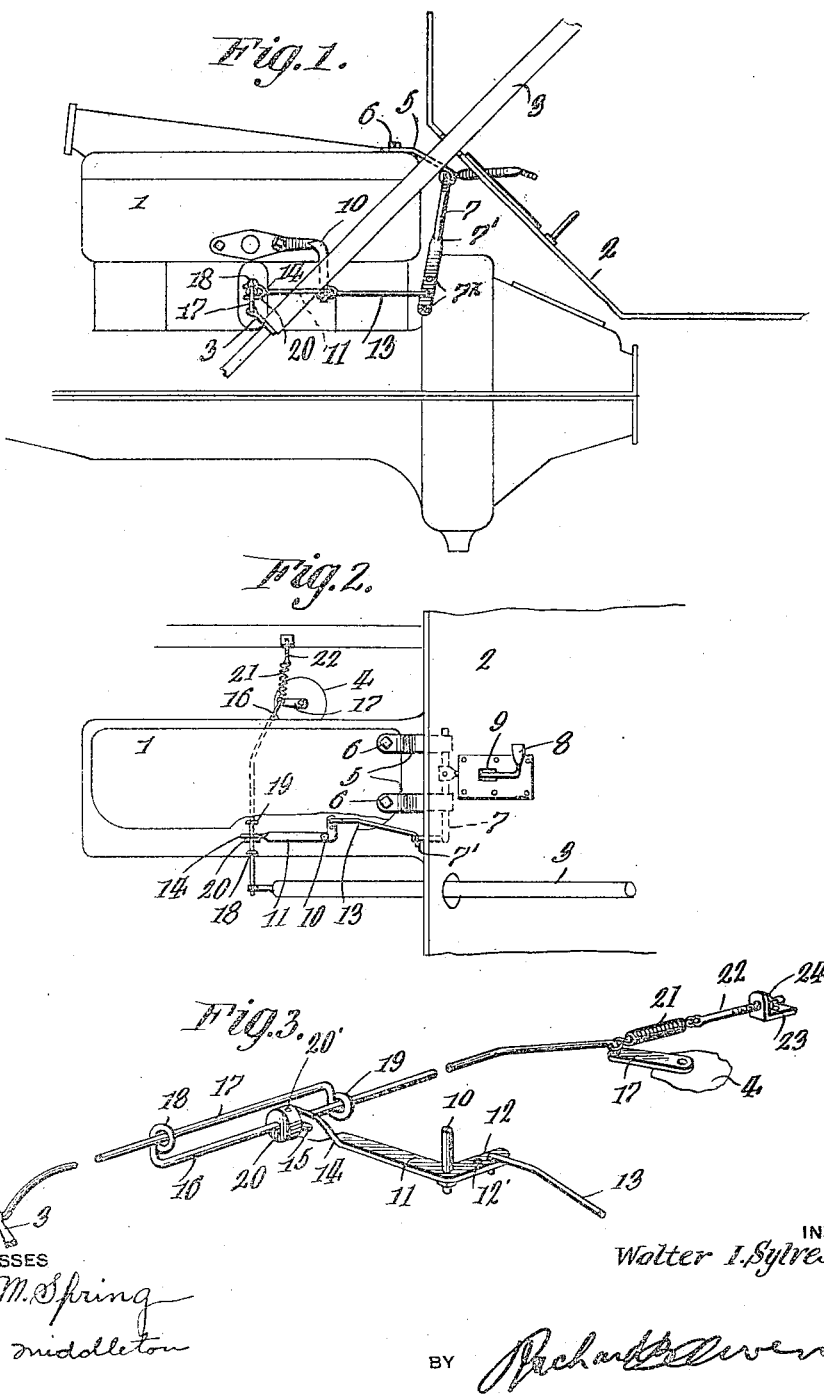

WALTER I. SYLVESTER, OF MARCUS, IOWA.

FOOT-THROTTLE FOR FORD AUTOS.

1,276,991.  Specification of Letters Patent.  Patented Aug. 27, 1918.

Application filed June 21, 1917. Serial No. 176,190.

*To all whom it may concern:*

Be it known that I, WALTER I. SYLVESTER, a citizen of the United States, residing at Marcus, in the county of Cherokee and State of Iowa, have invented certain new and useful Improvements in Foot-Throttles for Ford Autos, of which the following is a specification.

This invention relates to new and useful improvements in automobiles and the principal object of the invention is to provide a foot control for the throttle thereof.

Another object of the invention is to provide means whereby the throttle is automatically closed when the foot is removed from the pedal.

A further object of the invention is to provide means for attaching the improvement to existing models of automobiles with the minimum amount of interference therewith and by utilizing the bolts already on the automobile for securing the device in position.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter described, illustrated in the accompanying drawings and specifically pointed out in the appended claim.

In describing my invention in detail, reference will be had to the accompanying drawings, wherein like characters denote like or corresponding parts throughout the several views, and in which:

Figure 1 is a side view of parts of an automobile with my improvement in position.

Fig. 2 is a plan view of Fig. 1.

Fig. 3 is a perspective view of part of my improvement.

In these figures the invention is shown as applied to a Ford automobile, as it is particularly adapted for this type of machine. 1 indicates the power plant of the automobile, 2 the inclined part of the floor thereof, 3 the steering post and 4 the carbureter. In carrying out my invention I secure a pair of straps 5 to the end of the engine by means of the two end bolts 6 which secure the engine top in position and these straps extend under the inclined part of the floor and have their ends rolled up to grip a rod 7, said rod having rotary movement in said rolled up ends. A foot pedal 8 has its end rigidly secured to the rod 7 at a point located between the straps 6 and a hole 9 is made in the inclined floor through which the said pedal passes. The rod 7 is bent at right angles and the downwardly extending portion 7' is provided with a flattened end in which are a number of holes 7×. An angle bar 10 is secured to the engine by one of the bolts of the coupling for the hose of the return pipe of the radiator, and this angle bar supports a bell crank lever 11 which has its short arm 12 connected with the downwardly extending end of the rod 7 by means of the link 13. The link has its ends turned downwardly to engage with one of the holes 7× and the holes 12' in the angle lever. The long arm of the bell crank lever 11 has its end twisted as at 14 and provided with a fork 15 engaging with a rod 16 which is connected with the carbureter lever 17'. This rod replaces the usual rod which connects the carbureter with the rod on the steering post which is connected with the throttle lever. The rod 16 is connected with the rod on the steering post by means of a second rod 17 having sliding engagement with the rod 16 by means of the bent end of each rod being looped around the body of the other as at 18 and 19. A stop 20 on the rod 16 between said loops engages with the forked end 15 of the lever 11 so that the lever will move the rod 16, and the end 19 of rod 17 is adjacent this stop. A coil spring 21 connected with the end of lever 16 where it joins the lever 17' tends to force the lever 17' toward the right, this spring being connected to a suitable part of the frame of the automobile by means of the screw rod 22 and the clip 23, said rod being adjusted by means of the thumb nut 24.

In the normal position of the parts the spring 21 will hold the carbureter in closed position and the parts with the foot pedal raised. When the pedal is pressed by the foot the rod 7 will be rocked so as to move the long arm of the lever 11 toward the left which will carry the rod 16 with it and thus open the carbureter so that the speed of the motor is regulated by the amount of pressure applied to the foot pedal. This pedal is to be operated by the right foot of the operator and when he wishes to stop the automobile he will remove his foot from the pedal to place it on the brake pedal and the spring 21 will automatically close the throttle.

The amount of movement of the throttle may be regulated by adjusting the stop 20 on the rod 16 by means of the screw 20' and the holes 12' in the lever 11 and those 7× in the rod 7 also allow a certain amount of adjustment of the parts.

If it is desired to operate the throttle in the usual manner by means of the hand lever under the steering wheel this may be done as said lever is connected with the throttle by means of the rod 17, the spring 21 closing the throttle in this case, as before.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

A foot throttle mechanism for automobiles comprising straps secured to the engine and having bearings, a rod rocking therein and having a pedal and an arm projecting radially from it, a bell-crank lever pivoted at its angle, its long arm being slotted and its short arm connected with the radial arm on said rod, a rod passing through the slot of said long arm and having a loop at one extremity and its other extremity connected with the carbureter lever, a stop adjustably mounted on this rod against the slotted end of the bell-crank lever, and a second rod passing through the loop of the first and itself having a loop at one extremity embracing the body of said first rod and its other extremity connected with the throttle control mechanism on the steering post.

In testimony whereof I affix my signature in presence of two witnesses.

WALTER I. SYLVESTER.

Witnesses:
R. W. MOORE,
C. L. ELLIS.